J. FIELDHOUSE.
PIPE-WELDING TONGS.
No. 188,881. Patented March 27, 1877.
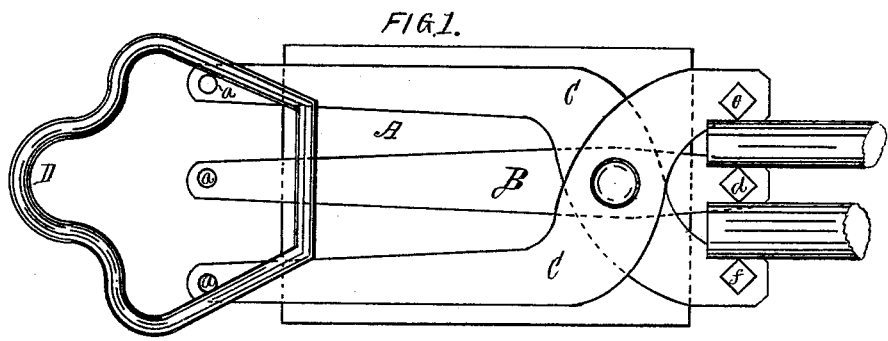
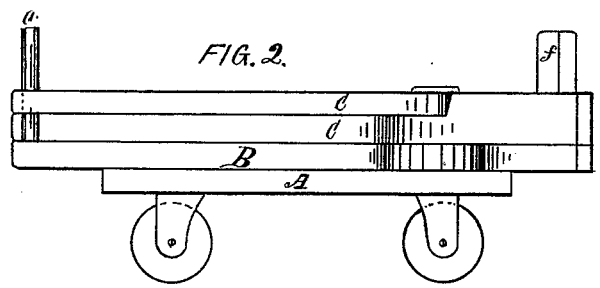
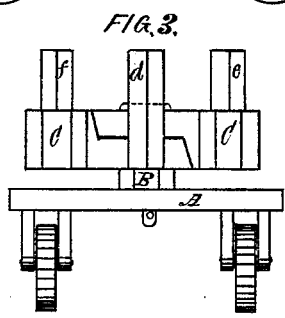

UNITED STATES PATENT OFFICE.

JOSEPH FIELDHOUSE, OF CHICAGO, ILLINOIS.

IMPROVEMENT IN PIPE-WELDING TONGS.

Specification forming part of Letters Patent No. 188,881, dated March 27, 1877; application filed December 22, 1876.

*To all whom it may concern:*

Be it known that I, JOSEPH FIELDHOUSE, of Chicago, in the county of Cook and State of Illinois, have invented a new and useful Improvement in Pipe-Welding Tongs; and I do hereby declare the following to be a full, clear, and exact description thereof, which will enable others skilled in the art to which it appertains to make and use the same, reference being had to the accompanying drawing, forming part of this specification, in which—

Figure 1 is a general plan or top view of a pipe-welding tongs embodying my said invention. Fig. 2 is a side elevation, and Fig. 3 is an end view, of the same.

Similar letters of reference indicate like parts in the several figures of the drawing.

My invention relates to that class of pipe-welding tongs employed to draw the pipe-blanks through the dies; and its object is to provide an arrangement whereby two pipes may be seized and drawn through the dies at one time, and by one and the same operation. To that end it consists in providing a three-part tongs, having a fixed jaw arranged between two movable ones, forming two separate pairs of jaws, whereby two pipes are seized and drawn through the dies at one time, and by one and the same operation.

In the drawing, A represents the ordinary truck used in the art of manufacturing wrought iron pipe for the purpose of carrying the tongs. Permanently mounted on the bed of this truck is a fixed bar or jaw, B, centrally located longitudinally. This bar is provided at its rear end with a vertical block, $d$, permanently attached thereto. The position of this block is such as to bring its corners in a line across the bar, as shown in Fig. 1. C C are the bars forming the movable jaws, which are pivoted to the bar B at a point near its rear end. These bars are also provided at their rear ends with vertical blocks $e\,f$, which are so located as to bring their corners in a line across the bars, and in a line with the corners of block $d$ when closed. Permanently attached to the forward end of each bar C C and B is a vertical bar, $a$, as shown in Figs. 1 and 2. D is a triangular-shaped stirrup, to which power is applied for moving the tongs. This stirrup is loosely placed over the bars, as shown in Fig. 1, and its shape is such that when it is moved forward its sides wedge against the outer side of the bars $a$ of the movable jaw-bars, moving the forward end of the latter bars toward each other, closing the jaws.

In using my invention, the ends of the pipes are first passed through the open dies, and the latter closed, when the ends of the pipes are separately introduced between the blocks $d\,e$ and $d\,f$ of the tongs. Power is then applied to the stirrup, causing the jaws to seize the pipe, and by the forward movement of the tongs the pipes are drawn through the dies, the center or fixed jaw preventing the pipes from coming in contact with each other.

Having thus described my invention, I claim—

In combination with the truck A and fixed bar B, having the block $d$, the movable bars C C, having the blocks $e\,f$, arranged to form the jaws, as specified.

JOSEPH FIELDHOUSE.

Witnesses:
J. T. WHIPPLE,
N. H. SHERBURNE.